United States Patent Office 3,060,030
Patented Oct. 23, 1962

3,060,030
LECITHINATED PRODUCT
Carl F. Obenauf and Charles W. Tatter, both % Beatrice Foods Co., 1526 S. State St., Chicago, Ill.
No Drawing. Filed Apr. 4, 1960, Ser. No. 19,463
5 Claims. (Cl. 99—15)

This invention relates to a lecithinated free-flowing powder, useful where lecithin is employed as an emulsifying agent. It is particularly valuable for baking mixes, e.g. cake mixes, where it is used as an emulsifier and assures easy pan release of the baked product while preventing falling or dipping in the center of the same.

Lecithin, as used in this invention and application, is essentially a refined grade containing a mixture of chemical lecithin, chemical cephalin, and chemical inositol phosphatides in a soybean carrier, the total lecithin chemicals being about 70% by weight and the carrier about 30% by weight.

Example 1

In making this product, about 40% of the above lecithin is added to about 10% of an oil shortening of vegetable origin, namely cottonseed oil, and the mixture melted at about 145° F. with stirring. About 50% milk solids not fat, namely skimmilk powder, is dissolved in enough water at about 145° F. to make a final emulsion (including said oil-lecithin mixture) of about 35% solids. The oil-lecithin mixture and the dissolved aqueous milk powder solution at about 145° F. are mixed together and pasteurized with stirring at about 145° F. for about 30 minutes. This final mixture-emulsion has about 35% solids. The mixture is now homogenized at about 1000 p.s.i.g. and spray-dried to give the powdered lecithinated product.

Instead of 40% of the said lecithin, about 30% to 50% of the same is useful.

Instead of mixed chemical lecithin, other grades are useful in the foregoing example in the same amount, namely crude or unrefined lecithin, the lecithin chemical fraction alone, the cephalin fraction alone, the inositol fraction alone, or mixtures of the same; also useful are the modified lecithins of the hydroxylated type disclosed in U.S. Patent 2,629,662, and reference is here made to "Technical Service Bulletin" of Central Soya Co., Inc., Chemurgy Division, 1825 N. Laramie Avenue, Chicago 39, Illinois.

Instead of hydrogenated cottonseed oil, unhydrogenated oil is used, hydrogenated or unhydrogenated soya bean oil, and hydrogenated or unhydrogenated corn oil are used, or an animal oil, such as lard is used, or mixtures of the various oils mentioned are employed, e.g. corn and cottonseed, soya bean and lard, etc. The amount of oil will vary from about 5% to 25% by weight.

The lecithin is added to and melted in the fat at about 145° F. to 165° F.

Instead of skimmilk powder, condensed skimmilk with or without added water may be used in amount to give the above-mentioned final solids content in the emulsion of 35% solids. Also, other edible protein coating materials, such as 50% sodium caseinate, or a mixture of about 20% to 40% sodium caseinate and about 30% to 10% sugar, dextrins, or gum arabic, or combinations of the foregoing are used in the same quantity range.

The amount of milk solids and other coating materials recited above or mixtures will range from about 30% to 60% on a dry basis. The solids content of the emulsion mixture before drying will vary from 30% to 40%.

Example 2

This example followed Example 1 except that we used 50% hydroxylated lecithin, 10% oil, and 40% milk solids.

Examples 3, 3a, 3b

This was the same as Example 1, except that we used in one case (Example 3), 40% "Centrophil S," and in another case (Example 3a), "Centrophil SH," and in a further case (Example 3b), 40% "Centrophil SM," 10% oil, and 50% milk solids. These fractions are high in lecithin chemical and cephalin chemical.

Example 4

This was like Example 1 except we used the 40% "Centrophil I" and diluted I grades, 10% oil and 50% milk solids. These are high in cephalin and inositol phosphatides and very low in chemical lecithins.

The milk solids not fat, whether as the powder dissolved in water or as condensed skimmilk, were heated at about 145° F. to 165° F. The other coating ingredients were also similarly treated before adding to the oil-lecithin mixture.

Pasteurizing of the mixture, i.e. the oil, lecithin and coating agent, is accomplished at about 145° F. for 30 minutes to 165° F. for 10 minutes.

Homogenizing is carried out at about 1000 p.s.i.g. to 2000 p.s.i.g., and with the mixture at a temperature of about 145° F. to 165° F.

The spray dried product contains about 28% lecithin chemical, 22% fat, and 50% milk solids, all by dry weight.

All percentages mentioned in this specification refer to a dry weight basis.

The fat forms the core of the particle which includes some lecithin chemical, and it is surrounded by a mixture of the milk solids or other coating, as described, also with some lecithin included.

In preparing the mixture of crude lecithin and crude, hydrogenated or refined cottonseed oil, we (1) heat all of these ingredients together with stirring at 145° F. to 165° F., or (2) we melt the lecithin and add it to the melted fat and heat the mixture with stirring to 145° F. to 165° F., or (3) we add the lecithin to a vat and pour over it the melted oil and stir at 145° F. to 165° F. for about 30 to 10 minutes. To such mixtures, the aqueous solution of edible coating material, e.g. skimmilk powder dissolved in water or condensed skimmilk, is added, or vice versa, and this solution also in some cases will be heated at a temperature of about 145° F. to 165° F. Always, stirring is carried out until a uniform emulsion is obtained with a temperature of about 145° F. to 165° F. for 30 to 10 minutes to promote the emulsifying and accomplish pasteurization while providing a mixture having about 30% to 40% total solids before drying or from 30% to 60% coating agent solids on a dry basis. In referring herein to mixtures of the coating agents, mixture of milk solids not fat, and other proteins, notably sodium caseinate, are useful, for example, equal parts are used in Example 1 and the other examples or the amounts of each protein is used in the mixture to give the equivalent of 50% milk solids not fat or between about 30% to 60% as indicated.

We claim:

1. A lecithinated spray dried free flowing powder containing about 30% to 50% lecithin, about 10% edible shortening oil, and a coating material in amount of about 30% to 60% selected from the group consisting of milk solids not fat, sodium caseinate, mixtures of the said proteins, and mixtures of the protein with a compound selected from the group consisting of sugar, dextrins and gum arabic, the fat forming substantially the core of each powder particle and including some of the lecithin, and the core having a coating of the said protein and protein mixtures with the remainder of the lecithin.

2. A lecithinated product according to claim 1, containing about 40% lecithin, 10% oil, and 50% coating material.

3. The process of preparing a lecithinated free flowing powder comprising preparing a mixture of about 30 to 50% lecithin, about 10% of a shortening oil, and about 30% to 60% of a coating material in aqueous solution selected from the group consisting of milk solids not fat, sodium caseinate, and mixtures of such proteins with a compound selected from the group consisting of sugar, dextrins and gum arabic, said mixture having about 30 to 40% solids, pasteurizing the mixture with stirring at about 145° F. for about 30 minutes to 165° F. for 10 minutes and forming an aqueous pasteurized emulsion.

4. The process according to claim 3 wherein the emulsion is homogenized.

5. The process according to claim 4 wherein the homogenized emulsion is spray dried.

References Cited in the file of this patent

UNITED STATES PATENTS

| | | |
|---|---|---|
| 2,018,781 | Gehrke | Oct. 29, 1935 |
| 2,447,726 | Allingham | Aug. 24, 1948 |
| 2,913,342 | Cameron et al. | Nov. 17, 1959 |

OTHER REFERENCES

"The Chemical Analysis of Foods and Food Products," by Jacobs, Third Edition, D. Van Nostrand Company, Inc., Princeton, New Jersey, page 480.